(12) United States Patent
Puccetti et al.

(10) Patent No.: US 8,292,777 B2
(45) Date of Patent: Oct. 23, 2012

(54) METHOD OF CONTROLLING A HYBRID VEHICLE DURING REGENERATIVE DECELERATION

(75) Inventors: Angelo Puccetti, Bracciano (IT); Giovanni Maria Gaviani, Rimini (IT)

(73) Assignees: Ente Per Le Nuove Tecnologie, L'Energia E L'Ambiente-Enea, Rome (IT); Magneti Marelli Powertrain S.p.A., Corbetta (IT)

( * ) Notice: Subject to any disclaimer, the term of this patent is extended or adjusted under 35 U.S.C. 154(b) by 836 days.

(21) Appl. No.: 12/205,128

(22) Filed: Sep. 5, 2008

(65) Prior Publication Data
US 2009/0057042 A1 Mar. 5, 2009

(30) Foreign Application Priority Data

Sep. 5, 2007 (IT) .............................. BO2007A0605

(51) Int. Cl.
*B60K 1/02* (2006.01)
*B60W 10/10* (2012.01)
*B60W 20/00* (2006.01)
*B60W 10/06* (2006.01)

(52) U.S. Cl. .. 477/3; 477/115; 180/65.265; 180/65.275; 180/65.28

(58) Field of Classification Search ............. 180/65.265, 180/65.275, 65.285, 165, 65.28; 477/3, 4, 477/5, 115, 904
See application file for complete search history.

(56) References Cited

U.S. PATENT DOCUMENTS

| 5,343,970 | A | * | 9/1994 | Severinsky | ................ | 180/65.25 |
| 6,307,277 | B1 | * | 10/2001 | Tamai et al. | ................ | 290/40 C |
| 6,359,345 | B1 | | 3/2002 | Suzuki | | |
| 7,243,010 | B2 | * | 7/2007 | Tabata et al. | ................... | 701/22 |
| 7,841,433 | B2 | * | 11/2010 | Soliman et al. | .......... | 180/65.265 |
| 8,074,755 | B2 | * | 12/2011 | Abe et al. | ................ | 180/65.265 |
| 8,177,004 | B2 | * | 5/2012 | Shibata et al. | ........... | 180/65.235 |
| 8,177,680 | B2 | * | 5/2012 | Shibata et al. | .................... | 477/3 |
| 2001/0023666 | A1 | * | 9/2001 | Suzuki | .............................. | 123/2 |
| 2003/0114269 | A1 | * | 6/2003 | Grassl et al. | ..................... | 477/3 |
| 2005/0099146 | A1 | * | 5/2005 | Nishikawa et al. | ............. | 318/63 |
| 2007/0102208 | A1 | * | 5/2007 | Okuda et al. | ................. | 180/65.3 |

FOREIGN PATENT DOCUMENTS

| EP | 1136298 | A2 | 9/2001 |
| EP | 1783021 | A2 | 5/2007 |

* cited by examiner

*Primary Examiner* — J. Allen Shriver, II
*Assistant Examiner* — James M Dolak
(74) *Attorney, Agent, or Firm* — Volpe and Koenig, P.C.

(57) ABSTRACT

A method of controlling a hybrid vehicle during regenerative deceleration, the method including: determining deceleration of the vehicle; upon determining deceleration of the vehicle, operating a reversible electric machine as a generator to regenerate part of the kinetic energy of the vehicle; establishing a respective minimum speed of an internal combustion engine for each gear of a servocontrolled mechanical power train; determining and engaging the highest gear which, combined with the current state of motion of the vehicle, runs the internal combustion engine at higher than the respective minimum speed; keeping the gear engaged as long as the internal combustion engine runs at higher than the respective minimum speed; and downshifting by one gear when the internal combustion engine runs at lower than the respective minimum speed.

10 Claims, 1 Drawing Sheet

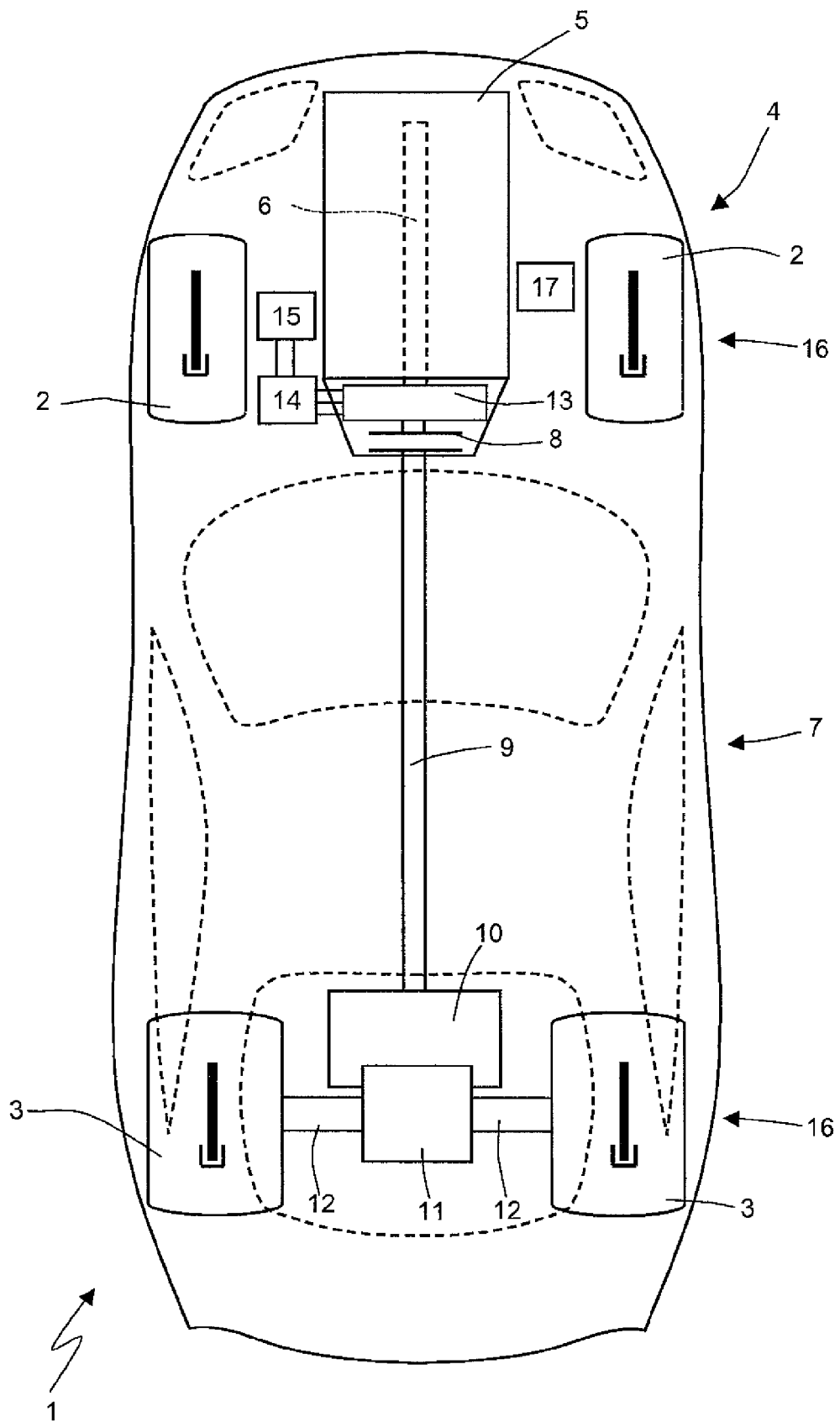

METHOD OF CONTROLLING A HYBRID VEHICLE DURING REGENERATIVE DECELERATION

FIELD OF INVENTION

The present invention relates to a method of controlling a hybrid vehicle during regenerative deceleration.

BACKGROUND

A hybrid vehicle comprises an internal combustion engine which transmits power to the drive wheels by a power train comprising a mechanical or automatic transmission; and an electric machine connected electrically to an electric storage system, and mechanically to the drive shaft of the combustion engine or to the power train, upstream or downstream from the transmission.

The vehicle can be run in various operating modes: a thermal operating mode, in which power is generated solely by the combustion engine, and the electric machine may operate as a generator to recharge the electric storage system; an electric operating mode, in which the combustion engine is turned off and power is generated solely by the electric machine operating as a motor; and a hybrid operating mode, in which power is generated by both the combustion engine and the electric machine operating as a motor. To improve overall energy efficiency throughout deceleration, the electric machine may be used as a generator for regenerative deceleration, in which the kinetic energy of the vehicle, as opposed to being completely dissipated in friction, is partly converted to electric energy which is stored in the electric storage system.

SUMMARY

The present invention is related to a method of controlling a hybrid vehicle during regenerative deceleration. The vehicle includes an internal combustion engine; a servo controlled mechanical power train having a number of gears and interposed between the internal combustion engine and drive wheels; and at least one reversible electric machine. The method includes determining deceleration of the vehicle; and upon determining deceleration of the vehicle, operating the reversible electric machine as a generator to regenerate part of the kinetic energy of the vehicle. The method also includes establishing a respective minimum speed of the internal combustion engine for each gear of the servo controlled mechanical power train. The method further includes determining and engaging the highest gear which, combined with the current state of motion of the vehicle, runs the internal combustion engine at higher than the respective minimum speed. The gear is kept engaged as long as the internal combustion engine runs at higher than the respective minimum speed. The method also includes downshifting by one gear when the internal combustion engine runs at lower than the respective minimum speed.

The present invention is also related to a method of controlling a hybrid vehicle during regenerative deceleration, the vehicle including an internal combustion engine; and at least one reversible electric machine. The method includes determining deceleration of the vehicle and upon determining deceleration of the vehicle, operating the reversible electric machine as a generator to regenerate part of the kinetic energy of the vehicle. The method also includes establishing a conventional coasting deceleration of the vehicle and operating the electric machine as a generator so the vehicle undergoes conventional coasting deceleration, if a brake system of the vehicle has not been activated.

BRIEF DESCRIPTION OF THE DRAWING

A non-limiting embodiment of the present invention will be described by way of example with reference to the accompanying drawing, which shows a schematic plan view of a hybrid automobile implementing the control method according to the present invention.

DETAILED DESCRIPTION OF THE PREFERRED EMBODIMENTS

Number 1 in the attached drawing indicates as a whole an automobile comprising two front wheels 2; and two rear drive wheels 3 powered by a propulsion system 4.

Propulsion system 4 comprises a front internal combustion engine 5 with a drive shaft 6; and a servocontrolled power train 7 which transmits the power generated by internal combustion engine 5 to the rear drive wheels 3, and in turn comprises a servocontrolled clutch 8 in a housing integral with internal combustion engine 5.

Clutch 8 is interposed between drive shaft 6 and a propeller shaft 9 terminating in a servocontrolled mechanical transmission 10 located at the rear and comprising a primary shaft connected to propeller shaft 9, and a secondary shaft connected to a differential 11, from which extend two axle shafts 12 integral with rear drive wheels 3.

Transmission 10 has a number of gears—in the example shown, six forward gears and a reverse gear. The forward gears are indicated by cardinal numbers from first to sixth, in which the first is the bottom gear (i.e. with the lowest velocity ratio between the rotation speed of drive wheels 3 and the rotation speed of drive shaft 6), and the sixth is the top gear (i.e. with the highest velocity ratio between the rotation speed of drive wheels 3 and the rotation speed of drive shaft 6).

A reversible electric machine 13 (i.e. which can operate both as a motor to absorb electric energy and generate mechanical work, and as a generator to absorb mechanical work and generate electric energy) is interposed between drive shaft 6 and clutch 8 and controlled by an actuator 14 connected electrically to an electric storage system 15. In other words, a shaft of reversible electric machine 13 supporting the rotor of reversible electric machine 13 is fitted at one end to drive shaft 6 and at the opposite end to the input of clutch 8.

Automobile 1 also comprises a brake system 16 (shown schematically) comprising four disk brakes, each fitted to a respective wheel 2 or 3; and an electronic central control unit 17 (shown schematically) for controlling propulsion system 4 and therefore internal combustion engine 5, servocontrolled power train 7, and electric machine 13.

The following is a description of the operation of automobile 1 in the event of regenerative deceleration.

At the design and tuning stage of automobile 1, a minimum speed of internal combustion engine 5 is established for each gear of transmission 10 (i.e. of power train 7), and is the speed below which handling of automobile 1 is compromised when the respective gear is engaged. In other words, when a given gear is engaged and internal combustion engine 5 falls below the respective minimum speed, handling of automobile 1 is compromised, e.g. combustion engine 5 may operate irregularly with oscillations resulting in jerky forward movement of automobile 1.

The minimum speeds of the gears increase from low to high gear, i.e. the minimum speed of the second gear is lower than that of the third gear, the minimum speed of the third gear is lower than that of the fourth gear, and so on. By way of example, the minimum speeds determined for an actual automobile 1 are as follows:

| Gear | Minimum speed |
|------|---------------|
| II   | 970 rpm       |
| III  | 1330 rpm      |
| IV   | 1515 rpm      |
| V    | 1625 rpm      |
| VI   | 1675 rpm      |

In forward-running conditions of automobile 1, electronic central control unit 17 determines deceleration of automobile 1, and accordingly operates reversible electric machine 13 as a generator to regenerate part of the kinetic energy of automobile 1. Deceleration of automobile 1 is typically established when, for a given length of time (typically a few seconds), internal combustion engine 5 (in the case of thermal propulsion) is cut off (i.e. produces no power) or electric machine 13 (in the case of electric propulsion) produces no power.

On determining deceleration of automobile 1, electronic central control unit 17 determines and engages the highest gear which, combined with the current state of motion of automobile 1, runs internal combustion engine 5 at higher than the respective minimum speed. In other words, electronic central control unit 17 determines and engages the highest possible gear that will run internal combustion engine 5 at higher than the minimum speed of the engaged gear.

Subsequently, electronic central control unit 17 keeps the gear engaged as long as internal combustion engine 5 runs at higher than the minimum speed of the engaged gear. When internal combustion engine 5 runs at lower than the minimum speed of the engaged gear, electronic central control unit 17 shifts down one gear (i.e. from fifth to fourth or from fourth to third) so that internal combustion engine 5 once more runs at higher than the minimum speed of the engaged gear.

The above gear control method provides for minimizing (compatibly with smooth handling of automobile 1, to prevent discomfort to passengers) the energy dissipated by internal combustion engine 5 in friction and pumping (i.e. "engine braking").

In a preferred embodiment, when deceleration is completed, automobile 1 is stopped with the second gear engaged (i.e. the first gear is not engaged); when internal combustion engine 5 falls below the minimum speed of the second gear, clutch 8 of servocontrolled mechanical power train 7 is released to disconnect internal combustion engine 5 from drive wheels 3. The reason the first gear is not engaged is mainly due to the synchronizing difficulties encountered in engaging the first gear while automobile 1 is still moving.

Deceleration of automobile 1 may be effected naturally by the resisting forces opposing the forward movement of automobile 1, or may also be forced by the braking action of brake system 16. On determining deceleration of automobile 1, electronic central control unit 17 determines whether brake system 16 has been activated.

If brake system 16 has not been activated, electronic central control unit 17 controls electric machine 13 (as far as possible) so that automobile 1 undergoes conventional coasting deceleration as established beforehand at the design and tuning stage. In other words, a conventional coasting deceleration of automobile 1 is established beforehand and, in the event of deceleration with no assistance from the brake system, is maintained (as far as possible) by appropriately controlling electric machine 13. In this way, electric machine 13 is prevented from producing variable decelerations which would undoubtedly be felt by the driver of automobile 1, thus giving the driver the unpleasant sensation that automobile 1 "has a mind of its own."

Conventional coasting deceleration is normally constant, but may also vary as a function of the speed of automobile 1 and, in particular, may increase alongside an increase in speed of automobile 1.

More specifically, if brake system 16 has not been activated, electronic central control unit 17: determines the overall brake torque to impart conventional coasting deceleration to automobile 1; assesses the total resisting torques acting on automobile 1; calculates a regenerative brake torque by subtracting the total resisting torques on automobile 1 from the overall brake torque; and operates electric machine 13 as a generator to absorb the regenerative brake torque at the shaft of electric machine 13. It is important to note that, if the regenerative brake torque is negative, electric machine 13 is turned off. That is, if the total resisting torques acting on automobile 1 alone produce greater than conventional coasting deceleration of automobile 1 (typically, in the case of strong opposing wind or uphill road gradients), electric machine 13 is turned off and is not used as a motor to achieve conventional coasting deceleration.

If brake system 16 has been activated, electronic central control unit 17 determines the brake deceleration of automobile 1 produced by acting on brake system 16 of automobile 1, and operates electric machine 13 as a generator so that automobile 1 is subjected to the same brake deceleration. In this case too, control of electric machine 13 is aimed at ensuring operation of electric machine 13 as a generator is in no way felt by the driver of automobile 1.

More specifically, if brake system 16 has been activated, electronic central control unit 17 determines the brake torque generated by brake system 16; establishes a regenerative brake torque no higher than the brake torque generated by brake system 16; operates electric machine 13 as a generator to absorb the regenerative brake torque at the shaft of electric machine 13; and controls brake system 16 to reduce its braking action by an amount equal to the regenerative brake torque.

Electronic central control unit 17 preferably determines the brake torque generated by brake system 16 and acting on the same axle as electric machine 13 (in the embodiment shown, the rear axle, i.e. rear wheels 3), and the regenerative brake torque is established no higher than the brake torque generated by brake system 16 and acting on the same axle as electric machine 13.

Finally, it is important to note that, unlike the typical operating mode of automatic transmissions, the method of shifting gear when decelerating automobile 1 first employs gears increasing in rapid (even non-sequential) discrete progression, whereas deceleration of automobile 1 is completed with gear ratios decreasing in discrete progression.

The main forces acting on the moving automobile 1 are: the resisting torque $C_S$ produced by the total road load (rolling resistance and drag); the torque $C_P$ produced by road gradients (a single torque that may be positive or negative); the inertial torque $C_I$ produced by the mass of the moving automobile 1; the inertial torque $C_J$ of the main rotary components of automobile 1 in the power train (rear drive wheels 3, power train 7, internal combustion engine 5, and electric machine 13). The decelerating action of inertial torques $C_I$ and $C_J$ takes place in the event of positive variations in the speed V of automobile 1 and in the rotation speed ω of the reduction shaft respectively. Moreover, when decelerating automobile 1, there is absolutely no propulsive force, i.e. no drive torque CM is produced by internal combustion engine 5 or electric machine 13.

Deceleration of automobile 1 must take into account the resisting torque $C_{ICE}$ (i.e. "engine brake") of internal combustion engine 5, which is the mechanical torque corresponding to pumping work, inertial torque, and internal dissipation phenomena. This resistance is a function of the rotation speed $\omega$ of internal combustion engine 5, and contributes significantly towards braking when decelerating and braking automobile 1.

When braking automobile 1, the brake torque $C_F$ produced by brake system 16 and proportional to the mass m of automobile 1 and to resulting deceleration $a_G$ must be considered. In the case of hydraulic brakes, the brake torque $C_F$ produced by brake system 16 is a linear function of the pressure in the brake actuating cylinders.

Finally, the braking forces when decelerating/braking automobile 1 include the mechanical generating torque $C_{GEN}$, which is the torque available at the shaft of electric machine 13 along the power train.

Given the above, the most general equation of the overall braking force corresponding to overall inertial torque $C_T = C_I + C_J$ for an automobile 1 of this class is:

$$C_T = C_I + C_J = C_S + C_P + C_F + C_{ICE} + C_{GEN} \quad (1)$$

Inertial terms $C_I$ and $C_J$ may be calculated as follows:

$$C_I = \frac{m \cdot a_G \cdot R_O}{\prod_i \tau_i} \quad (2)$$

$$C_J = \frac{d\omega}{dt} \cdot \sum_i \frac{J_i}{\prod_i \tau_i^2}$$

$a_G$ deceleration of automobile 1 when braking;
m mass of automobile 1;
$R_O$ wheel rolling radius;
$\tau_i$ velocity ratios;
$J_i$ moments of inertia.

In the first inertial term $C_I$, the moltiplication in the denominator refers to the velocity ratios $\tau_i$ of all the transmission devices between rear drive wheels 3 and electric machine 13, whereas the second inertial term $C_J$ refers to angular acceleration of the electric machine shaft which moltiplies the total mass moments of inertia of the main rotary members of the power train, again between rear drive wheels 3 and electric machine 13. For each i-th member of moment of inertia $J_i$, the reduction has in the denominator the moltiplication of the square values of the velocity ratios of the reducing devices only.

Total inertial torque $C_T$ therefore equals:

$$C_T = C_I + C_J = C_T(a_G, \dot{\omega}, \tau_{c(i)}) \quad (3)$$

Equation (1) provides for determining the generating torque $C_{GEN}$ at the shaft of electric machine 13 when decelerating (running condition of automobile 1, in which internal combustion engine 5 provides no propulsion) and braking.

When decelerating only, term $C_F$ is absent, and no brake torque is applied to wheels 2 and 3 by brake system 16. Generating torque $C_{GEN}$ may be determined using the conventional coasting deceleration value $\tilde{a}_G$ which ensures adequate handling and stability conditions when decelerating. When only decelerating automobile 1, mechanical generating torque $C_{GEN}$ may be determined from equation (1), in this case without term $C_F$, taking into account equation (3) in which total inertial torque $C_T$ is expressed as a function of predetermined deceleration $\tilde{a}_G$, as a function of angular deceleration $\dot{\omega}$ to be determined, and as a function of the transmission velocity ratio $\tau_{c(i)}$ of the engaged gear. This gives the following equation:

$$C_{GEN} = C_T(\tilde{a}_G, \dot{\omega}, \tau_{c(i)}) - C_S - C_P - C_{ICE} \quad (4)$$

Calculating torque $C_{GEN}$ when braking calls for determining deceleration of automobile 1 $a_G$, angular deceleration $\omega$ of the reduction shaft, and brake torque $C_F$ applied to wheels 2 and 3 and reduced at the reduction shaft, taking into account the maximum torque value $C_{GEN\_MAX}$ characteristic of electric machine 13. The following inequality must result:

$$C_{GEN} \leq C_{GEN\_MAX} \quad (5)$$

In this case, for stable braking in electric mode, the equation between the front and rear brake torques $C_{Fa}$ and $C_{Fr}$ according to the brake dividing factor k characteristic of brake system 16 and of the brake level, as defined below, must be respected:

$$k = \frac{C_{Fa}}{C_{Fr}} \quad (6)$$

The fractions of brake torque $C_F$ applied respectively to the front $C_{Fa}$ and rear $C_{Fr}$ are as shown in the following equations:

$$C_{F\_a} = C_F \cdot \frac{k}{k+1} \quad (7)$$

$$C_{F\_r} = C_F \cdot \frac{1}{k+1}$$

The actual generating torque $C_{GEN\_r}$ available at the shaft of electric machine 13 and to be applied when braking to the rear shaft (i.e. rear wheels 3) is always as shown in equation (1), taking into account equation (3) and equations (7), with the limitation introduced by inequality (5). The resulting equation is as follows:

$$\begin{cases} C_{GEN\_r} = C_T(a_G, \dot{\omega}, \tau_{C(i)}) - C_S - C_P - C_F \cdot \dfrac{k}{k+1} - C_{ICE} \\ C_{GEN} \leq C_{GEN\_MAX} \end{cases} \quad (8)$$

Similarly, the equation for calculating $C_{GEN\_a}$, in the more common case of automobiles with front drive wheels 2 is $$\begin{cases} C_{GEN\_a} = C_T(a_G, \dot{\omega}, \tau_{C(i)}) - C_S - C_P - C_F \cdot \dfrac{1}{k+1} - C_{ICE} \\ C_{GEN} \leq C_{GEN\_MAX} \end{cases} \quad (9)$$

Two operating ranges for electric machine 13 in generator mode are thus defined: a first corresponding to deceleration only of automobile 1 (Low Range) and defined by predetermined conventional coasting deceleration value $\tilde{a}_G$; and a second relative to braking (Wide RangeE) and defined by torque $C_{GEN\_MAX}$ of electric machine 13. The aim of the present invention is to optimize regenerative deceleration and braking, during which part of the kinetic energy of automobile 1, which would otherwise be dissipated, is converted electromechanically.

Resisting torque $C_{ICE}$ of internal combustion engine 5 increases alongside an increase in the speed and throttle (i.e. depression) of internal combustion engine 5, and is maximum in "release conditions" (maximum throttle) of internal combustion engine 5, which is the operating condition of internal combustion engine 5 when decelerating automobile 1. Depending as it does on the speed of internal combustion engine 5, a reduction in the speed of internal combustion engine 5 when decelerating automobile 1 therefore reduces resisting torque $C_{ICE}$ regardless of the speed of automobile 1. The reduction in resisting torque $C_{ICE}$ of internal combustion engine 5 may be compensated with a corresponding increase in mechanical generating torque $C_{GEN}$, with advantages in terms of the overall efficiency of automobile 1.

Another positive aspect that contributes towards improving performance of automobile 1 is the reduction in the speed of electric machine 13 when decelerating automobile 1, thus improving operating efficiency in generator mode. This condition is brought about when the reduction in speed nears the nominal operating range of electric machine 13.

The control method described above has numerous advantages, by being cheap and easy to implement, with no additional component parts over and above those of a normal hybrid vehicle, and above all by maximizing the energy efficiency of regenerative deceleration with no discomfort to the occupants of the vehicle.

Testing of the control method in normal urban conditions as well as in conformance with the urban part of the NEDC (New European Driving Cycle) test procedure shows a reduction of up to 50% in power dissipation when decelerating.

For example, assuming automobile 1 is running at 60 km/h in urban conditions, automobile 1 alone (in neutral) absorbs a power $P_S$ of 4.0 kW when decelerating, and the resisting power of internal combustion engine 5 is a function of the gear engaged. At 60 km/h in third gear, the speed of internal combustion engine 5 is 4000 rpm, and power dissipation $P_{ICE}$ is 8.2 kW, thus giving an overall resisting power $(P_S+P_{ICE})$ of 4.0+8.2=12.2 kW. Assuming a shift from third to fourth gear at the same speed of automobile 1, engine speed falls from 4000 to 3000 rpm, which corresponds to 5.5 kW power dissipation, thus giving a total power of 4.0+5.4=9.4 kW. A double shift from third to fifth gear gives a speed of 2400 rpm of internal combustion engine 5 with power dissipation of only 4.0 kW, thus giving a total power absorption in this case of 4.0+4.0=8.0 kW. The roughly 35% and 50% reductions in power absorption by the engine $P_{ICE}$ in the above two cases reduces the braking effect of internal combustion engine 5, which may be compensated by increased regenerative braking in electric mode, with significant advantages in terms of the overall efficiency of automobile 1.

What is claimed is:

1. A method of controlling a hybrid vehicle (1) during regenerative deceleration, the vehicle (1) comprising an internal combustion engine (5); a servocontrolled mechanical power train (7) having a number of gears and interposed between the internal combustion engine (5) and drive wheels (3); and at least one reversible electric machine (13);
the method comprising:
determining deceleration of the vehicle (1);
upon determining deceleration of the vehicle (1), operating the reversible electric machine (13) as a generator to regenerate part of the kinetic energy of the vehicle (1);
establishing a respective minimum speed of the internal combustion engine (5) for each gear of the servocontrolled mechanical power train (7);
determining and engaging the highest gear which, combined with the current state of motion of the vehicle (1), runs the internal combustion engine (5) at higher than the respective minimum speed;
keeping the current gear engaged as long as the internal combustion engine (5) runs at higher than the respective minimum speed to minimize engine braking; and
downshifting by one gear when the internal combustion engine (5) runs at lower than the respective minimum speed;
wherein the respective minimum speed of the internal combustion engine (5) for each gear of the servocontrolled mechanical power train (7) increases from low to high gear so that the minimum speed of a lower gear is lower than that of a higher gear.

2. The method as claimed in claim 1, wherein, when deceleration is completed, the vehicle (1) is stopped in second gear; when the speed of the internal combustion engine (5) falls below the minimum speed of the second gear, a clutch (8) of the servocontrolled mechanical power train (7) is released to disconnect the internal combustion engine (5) from the drive wheels (3).

3. The method as claimed in claim 1, further comprising:
establishing a conventional coasting deceleration of the vehicle (1); and
operating the electric machine (13) as a generator so the vehicle (1) undergoes conventional coasting deceleration, if a brake system (16) of the vehicle (1) has not been activated.

4. The method as claimed in claim 3, further comprising:
determining overall brake torque to impart conventional coasting deceleration to the vehicle (1); assessing the total resisting torques acting on the vehicle (1);
calculating a regenerative brake torque by subtracting the total resisting torques on the vehicle (1) from the overall brake torque; and
operating the electric machine (13) as a generator to absorb the regenerative brake torque at the shaft of the electric machine (13).

5. The method as claimed in claim 4, wherein the electric machine (13) is turned off if the regenerative brake torque is negative.

6. The method as claimed in claim 3, wherein conventional coasting deceleration is constant.

7. The method as claimed in claim 3, wherein conventional coasting deceleration varies as a function of the speed of the vehicle (1).

8. The method as claimed in claim 1, further comprising:
determining brake deceleration of the vehicle (1) produced by acting on a brake system (16) of the vehicle (1); and
operating the electric machine (13) as a generator so the vehicle (1) undergoes the same brake deceleration.

9. The method as claimed in claim 8, further comprising:
determining the brake torque generated by the brake system (16);
establishing a regenerative brake torque no higher than the brake torque generated by the brake system (16);
operating the electric machine (13) as a generator to absorb the regenerative brake torque at the shaft of the electric machine (13); and
operating the brake system (16) to reduce its braking action by an amount equal to the regenerative brake torque.

10. The method as claimed in claim 9, wherein the brake torque generated by the brake system (16) and acting on the same shaft as the electric machine (13) is determined, and the regenerative brake torque is established no higher than the brake torque generated by the brake system (16) and acting on the same shaft as the electric machine (13).

* * * * *